United States Patent
Zhang et al.

(10) Patent No.: US 11,243,085 B2
(45) Date of Patent: Feb. 8, 2022

(54) SYSTEMS, METHODS, AND A COMPUTER PROGRAM PRODUCT FOR UPDATING MAP DATA

(71) Applicant: HERE GLOBAL B.V., Eindhoven (NL)

(72) Inventors: Zhenhua Zhang, Chicago, IL (US); Leon Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 246 days.

(21) Appl. No.: 16/412,083

(22) Filed: May 14, 2019

(65) Prior Publication Data

US 2020/0363217 A1    Nov. 19, 2020

(51) Int. Cl.
*G01C 21/32* (2006.01)
*G01C 21/36* (2006.01)

(52) U.S. Cl.
CPC ......... *G01C 21/32* (2013.01); *G01C 21/3694* (2013.01)

(58) Field of Classification Search
CPC . G01C 21/32; G01C 21/3694; G06K 9/00818
See application file for complete search history.

(56) References Cited

U.S. PATENT DOCUMENTS

| | | | |
|---|---|---|---|
| 9,459,626 B2 | 10/2016 | Chen et al. | |
| 9,463,794 B1 | 10/2016 | Silver et al. | |
| 9,530,313 B2 * | 12/2016 | Dannenbring | ....... G06K 9/6256 |
| 9,651,393 B2 | 5/2017 | Takahashi | |
| 9,746,331 B1 | 8/2017 | Yu et al. | |
| 10,891,501 B2 * | 1/2021 | He | ....... G06K 9/00818 |
| 2017/0154229 A1 * | 6/2017 | Yoshitomi | ....... G06K 9/00798 |
| 2018/0023959 A1 | 1/2018 | Ivanov et al. | |
| 2021/0033406 A1 * | 2/2021 | Watanabe | ....... G01C 21/32 |

FOREIGN PATENT DOCUMENTS

WO    WO-2009059766 A1 *    5/2009    ............. G01C 21/32

* cited by examiner

*Primary Examiner* — Rami Khatib
*Assistant Examiner* — Shahira Baajour
(74) *Attorney, Agent, or Firm* — Ditthavong, Steiner & Mlotkowski

(57) ABSTRACT

A method, a system, and a computer program product are provided for updating one or more attributes of a learned road sign (LRS). The system, for example, comprising at least one non-transitory memory configured to store computer program code instructions; and at least one processor is configured to execute the computer program code instructions to obtain sensor data associated with the LRS and determine a plurality of first downstream links associated with the LRS, based on the sensor data. Further, the at least one processor is configured to select a candidate downstream link from the plurality of first downstream links based on a heading difference between the LRS and each of the plurality of first downstream link and to update the one or more attributes of the LRS, based on the candidate downstream link.

19 Claims, 8 Drawing Sheets

SYSTEMS, METHODS, AND A COMPUTER PROGRAM PRODUCT FOR UPDATING MAP DATA

TECHNOLOGICAL FIELD

The present disclosure generally relates to mapping and navigation, and more particularly relates to updating attributes of a learned road sign at an intersection of two or more roads.

BACKGROUND

Various navigation applications are available to provide directions for driving, walking, or other modes of travel. Web sites and mobile applications offer map applications that allow a user to request directions from one point to another. Navigation devices based on Global Positioning System (GPS) technology have become common, and these systems are capable of determining the location of a device to provide directions to drivers, pedestrians, cyclists, and the like. Road signs placed on a road are meant for alerting travelers including vehicles, bicycles, pedestrians etc. regarding traffic on the road. Road signs may also serve to alert travelers regarding the speed limit for a particular roadway. They may also help bring attention to detours, construction work, and hazards, such as sharp turns and steep hills. As part of a navigation process, it is important for users of vehicles and autonomous and semi-autonomous vehicles to detect road signs, such as, "men at work" sign, "roadwork ahead" sign, etc., or temporary signs such as barrier boards, etc. with accurate positioning of these signs. Accurate detection of road signs is important for navigation of autonomous vehicles and providing environmental awareness for vehicle safety has been a primary concern for automobile manufacturers and related service providers. In vehicles, such as, autonomous vehicles, a plurality of sensors are installed to capture road sign observations and road signs are learnt from the road sign observations. However, with current sensors, the autonomous vehicles may not be able to detect road signs accurately.

BRIEF SUMMARY

Vehicles on a road typically rely on map databases that contain information regarding road geometry, lane geometry, road link connectivity, road type, etc. The information in the map databases may be enriched with data sources that provide traffic data, weather related data, and information related to road maintenance. A plurality of sensors installed onboard the vehicles may provide information related to road signs to augment the content of the map databases or remote map data providers, alert the user of the vehicles of a hazardous condition or even provide input for controlling the vehicle in an autonomous or semi-autonomous manner. The plurality of sensors are configured to identify surroundings and location of the vehicles. Accurate detection of the road signs is essential for navigation of vehicles, and providing environmental awareness for vehicle safety has been a primary concern for automobile manufacturers and related service providers.

Generally, a number of running vehicles capture the road sign observations, and provide location of the road signs as location of the capturing vehicles when the signs exit field of view of the vehicles' camera. However, due to several reasons the autonomous vehicles may not be able to detect road signs accurately. At intersection of two or more roads, a road sign applicable for a particular road may be placed close to the intersection. As a result, vehicles, driving on other roads near the intersection, may observe the road sign applicable for a road other than the actual road for which the road sign is truly applicable. Thus, road sign observation for the road sign at the intersection may be wrongly associated and recorded in the map database. In such scenarios, it would be advantageous to update the map database, particularly for accurate detection of the road signs at intersections of multiple roads.

A system, a method, and a computer program product are provided in accordance with an example embodiment described herein for updating one or more attributes of a learned road sign (LRS).

In one aspect, a system for updating one or more attributes of a learned road sign (LRS) is disclosed. The system comprises at least one non-transitory memory configured to store computer program code instructions; and at least one processor configured to execute the computer program code instructions to obtain sensor data associated with the LRS, wherein the sensor data satisfies an on-route distance criterion and a downstream link count criterion; determine a plurality of first downstream links associated with the LRS, based on the sensor data; select a candidate downstream link from the plurality of first downstream links based on a heading difference between the LRS and each of the plurality of first downstream link; and update the one or more attributes of the LRS, based on the candidate downstream link.

According to some example embodiments, the at least one processor is further configured to generate a notification based on the updated one or more attributes of the LRS.

According to some example embodiments, the downstream link count criterion includes a condition that a map-matched link of the LRS has at least two connected downstream links in immediate downstream of the map-matched link.

According to some example embodiments, the on-route distance criterion comprises a condition that the on-route distance between a map-matched location of the LRS and a link end location of the map-matched link of the LRS is less than a threshold distance.

According to some example embodiments, the link end location is based on the first heading and a driving direction of the map-matched link.

According to some example embodiments, the sensor data comprises a link ID of a map-matched link of the LRS, a map-matched location of the LRS, and a first heading of the map-matched link of the LRS.

According to some example embodiments, to determine the plurality of the first downstream links associated with the LRS, the at least one processor is further configured to search in downstream of the LRS based on the link ID of the map-matched link, wherein the plurality of first downstream links have a common start node.

According to some example embodiments, to select the candidate downstream link from the plurality of first downstream links, the at least one processor is further configured to obtain a second heading of each of the plurality of first downstream links based on link data of each of the plurality of first downstream links; determine the heading difference between the LRS and each of the plurality of first downstream link, based on the first heading of the map-matched link of the LRS and the second heading of each of the plurality of first downstream links; and select the candidate downstream link from the plurality of first downstream links, based on the heading difference of the candidate downstream link being the smallest among the plurality of first downstream links.

According to some example embodiments, the one or more attributes of the LRS comprises the link ID of the map-matched link of the LRS and the map-matched location of the LRS.

In another aspect, a method for updating one or more attributes of a learned road sign (LRS) is disclosed. The method comprising obtaining sensor data associated with the LRS, the sensor data satisfies an on-route distance criterion and a downstream link count criterion; determining a plurality of first downstream links associated with the LRS, based on the sensor data; selecting a candidate downstream link from the plurality of first downstream links based on a heading difference between the LRS and each of the plurality of first downstream link; and updating the one or more attributes of the LRS, based on the candidate downstream link.

According to some example embodiments, the method further comprising generating a notification based on the updated one or more attributes of the LRS.

According to some example embodiments, the downstream link count criterion includes a condition that a map-matched link of the LRS has at least two connected downstream links in immediate downstream of the map-matched link.

According to some example embodiments, the on-route distance criterion comprises a condition that the on-route distance between a map-matched location of the LRS and a link end location of the map-matched link of the LRS is less than a threshold distance.

According to some example embodiments, the link end location is based on the first heading and a driving direction of the map-matched link.

According to some example embodiments, the sensor data comprises a link ID of a map-matched link of the LRS, a map-matched location of the LRS, and a first heading of the map-matched link of the LRS.

According to some example embodiments, the determining the plurality of the first downstream links associated with the LRS further comprising searching in downstream of the LRS based on the link ID of the map-matched link, wherein the plurality of first downstream links have a common start node.

According to some example embodiments, the selecting the candidate downstream link from the plurality of first downstream links further comprising obtaining a second heading of each of the plurality of first downstream links based on link data of each of the plurality of first downstream links; determining the heading difference between the LRS and each of the plurality of first downstream link, based on the first heading of the map-matched link of the LRS and the second heading of each of the plurality of first downstream links; and selecting the candidate downstream link from the plurality of first downstream links, based on the heading difference of the candidate downstream link being the smallest among the plurality of first downstream links.

According to some example embodiments, the one or more attributes of the LRS comprises the link ID of the map-matched link of the LRS and the map-matched location of the LRS.

In yet another aspect, a computer program product comprising at least one non-transitory computer-readable storage medium having stored thereon computer-executable program code instructions which when executed by a computer, cause the computer to carry out operations for updating one or more attributes of a learned road sign (LRS) is disclosed. The operations comprise obtaining sensor data associated with the LRS, wherein the sensor data satisfies an on-route distance criterion and a downstream link count criterion; determining a plurality of first downstream links associated with the LRS, based on the sensor data; selecting a candidate downstream link from the plurality of first downstream links based on a heading difference between the LRS and each of the plurality of first downstream link; and updating the one or more attributes of the LRS, based on the candidate downstream link.

According to some example embodiments, to select the candidate downstream link from the plurality of first downstream links, the operations further comprise obtaining a second heading of each of the plurality of first downstream links based on link data of each of the plurality of first downstream links; determining the heading difference between the LRS and each of the plurality of first downstream links, based on a first heading of the map-matched link of the LRS and the second heading of each of the plurality of first downstream links; and selecting the candidate downstream link from the plurality of first downstream links, based on the heading difference of the candidate downstream link being the smallest among the plurality of first downstream links.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
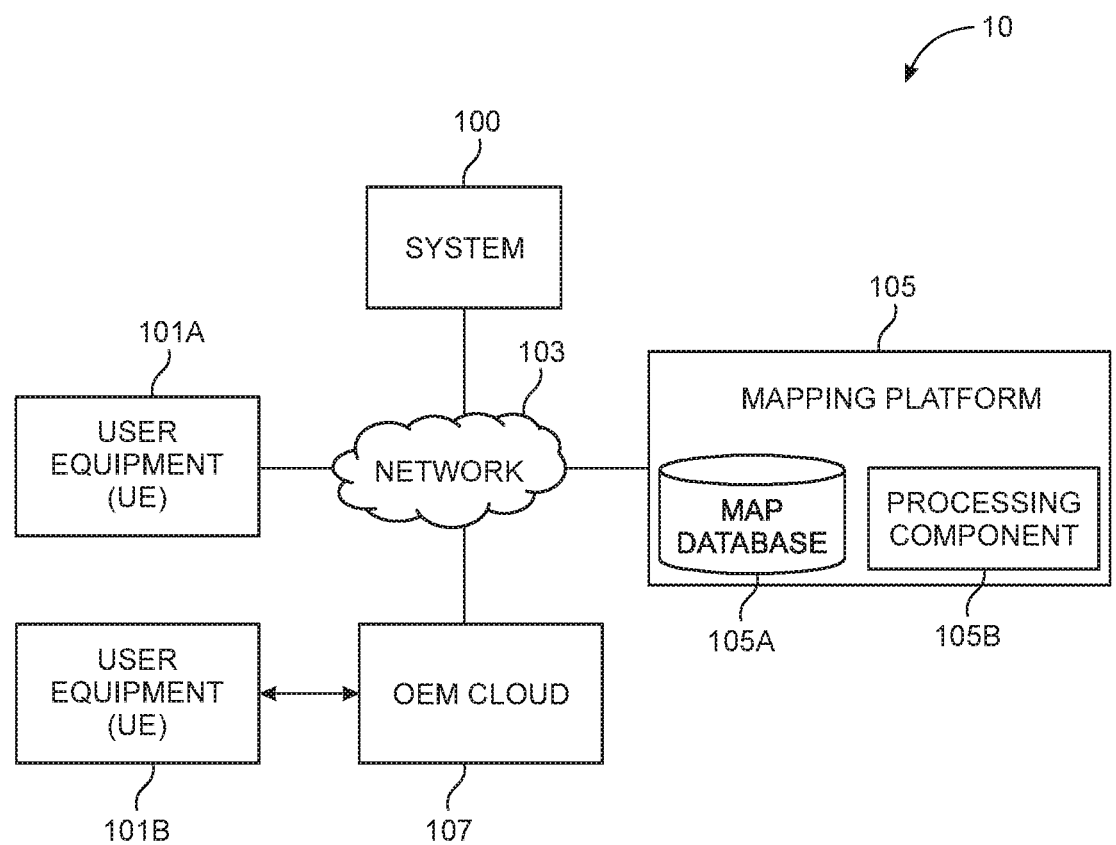
Figure 2:
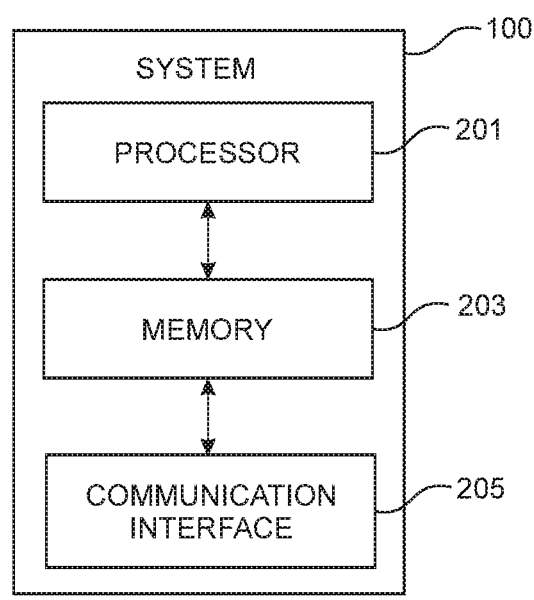
Figure 3:
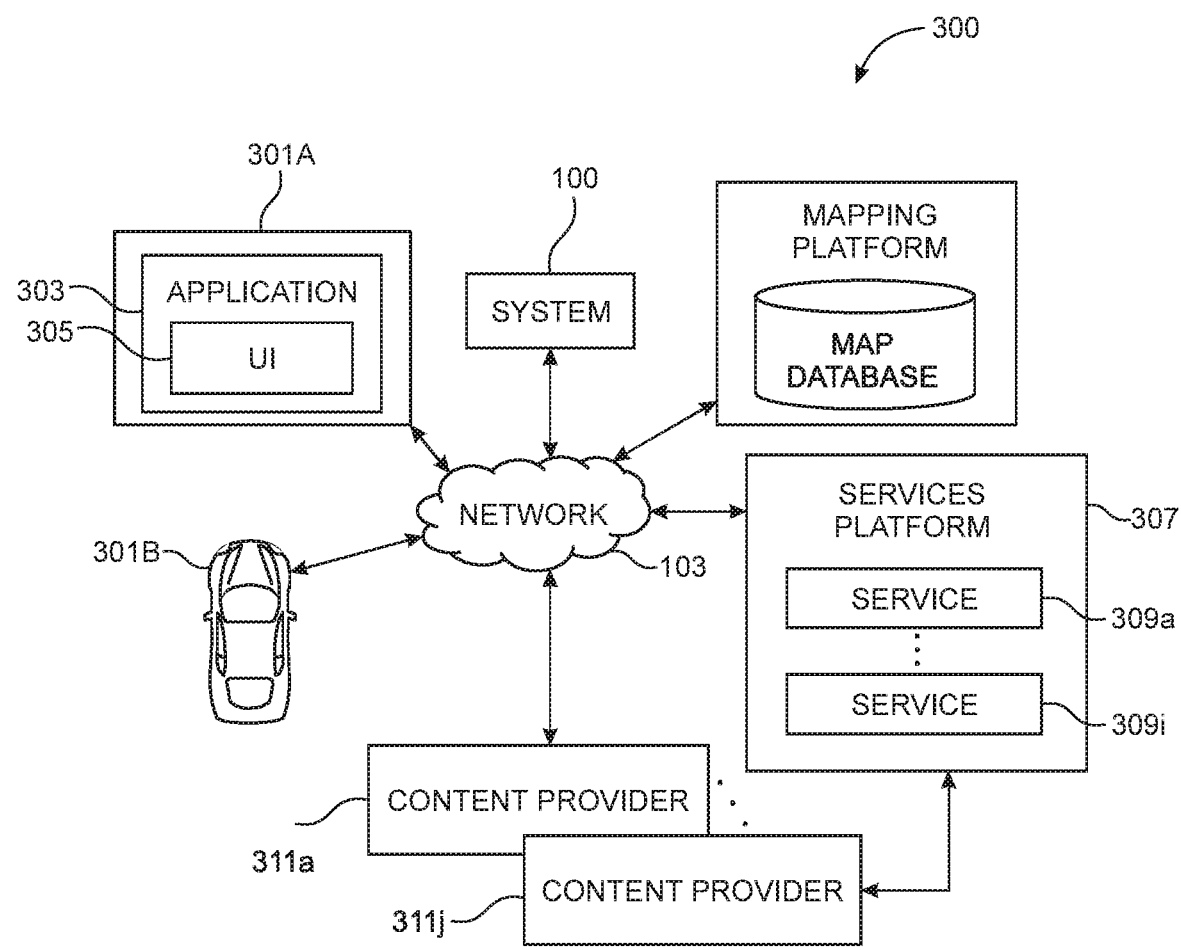
Figure 4:
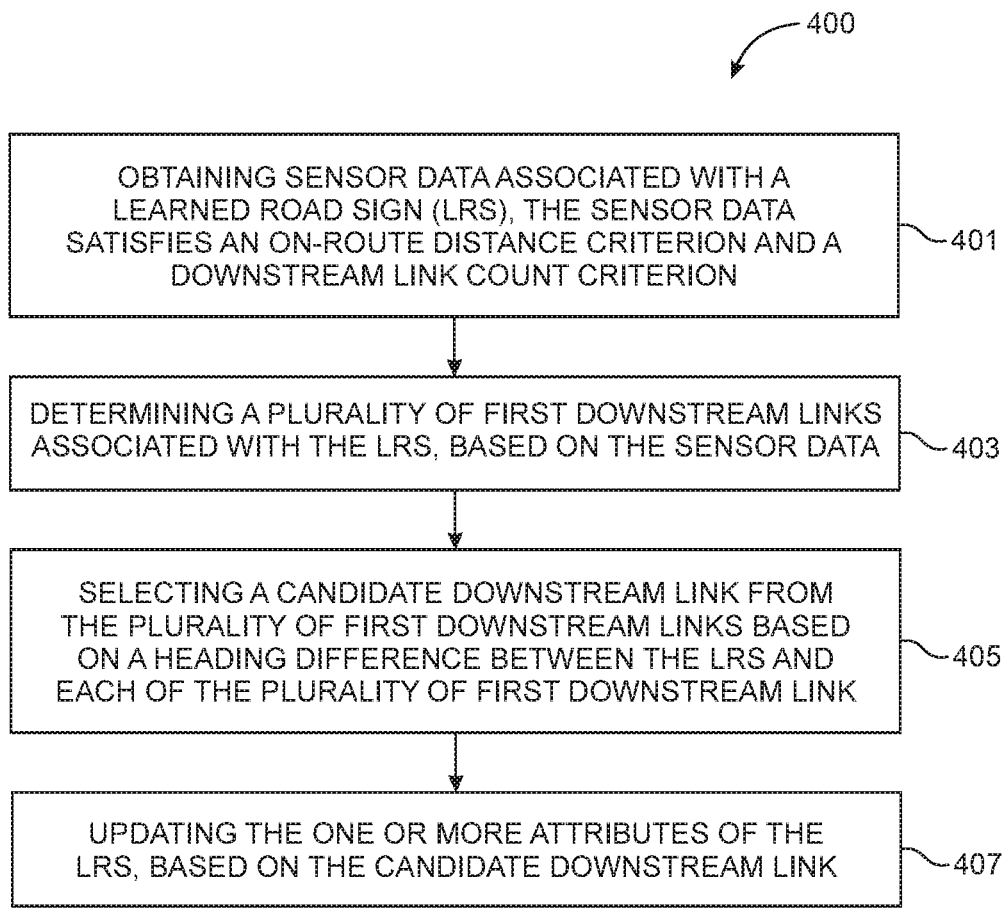
Figure 5A:
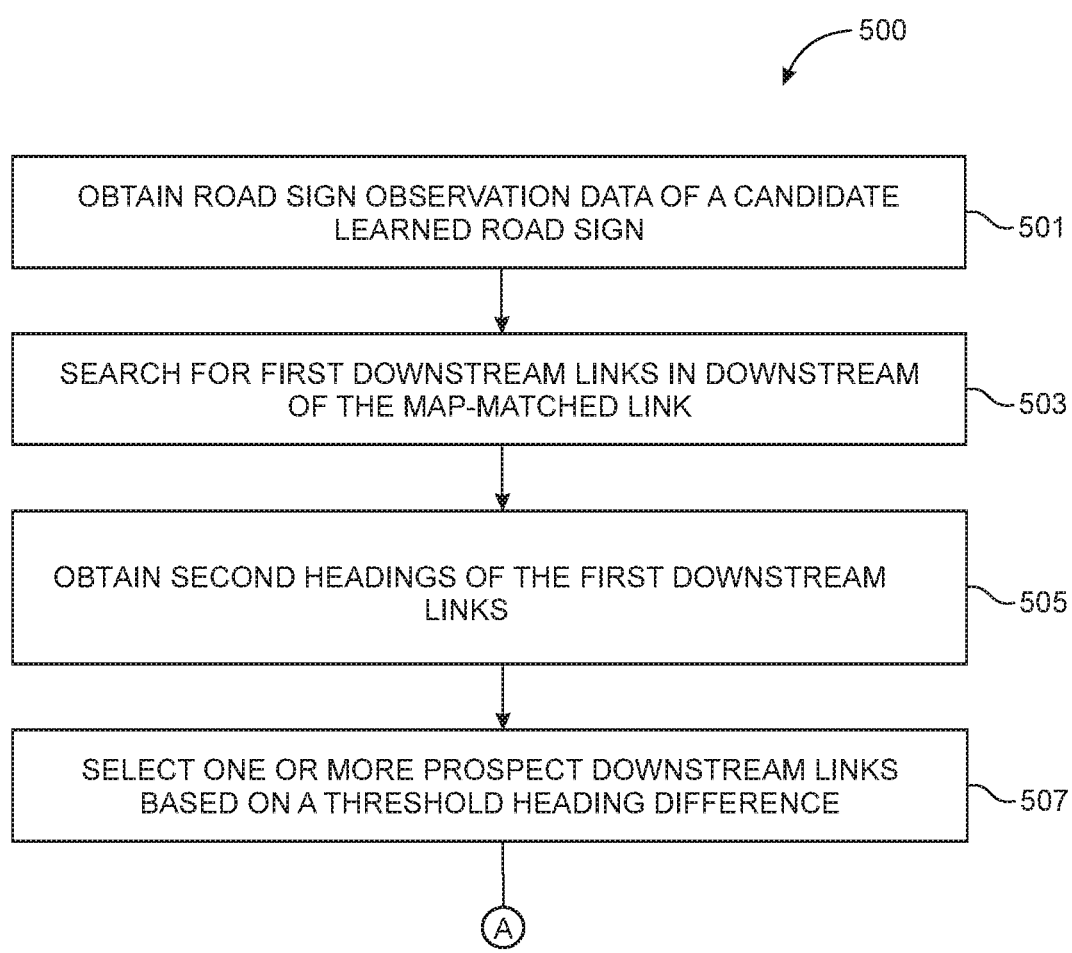
Figure 5B:
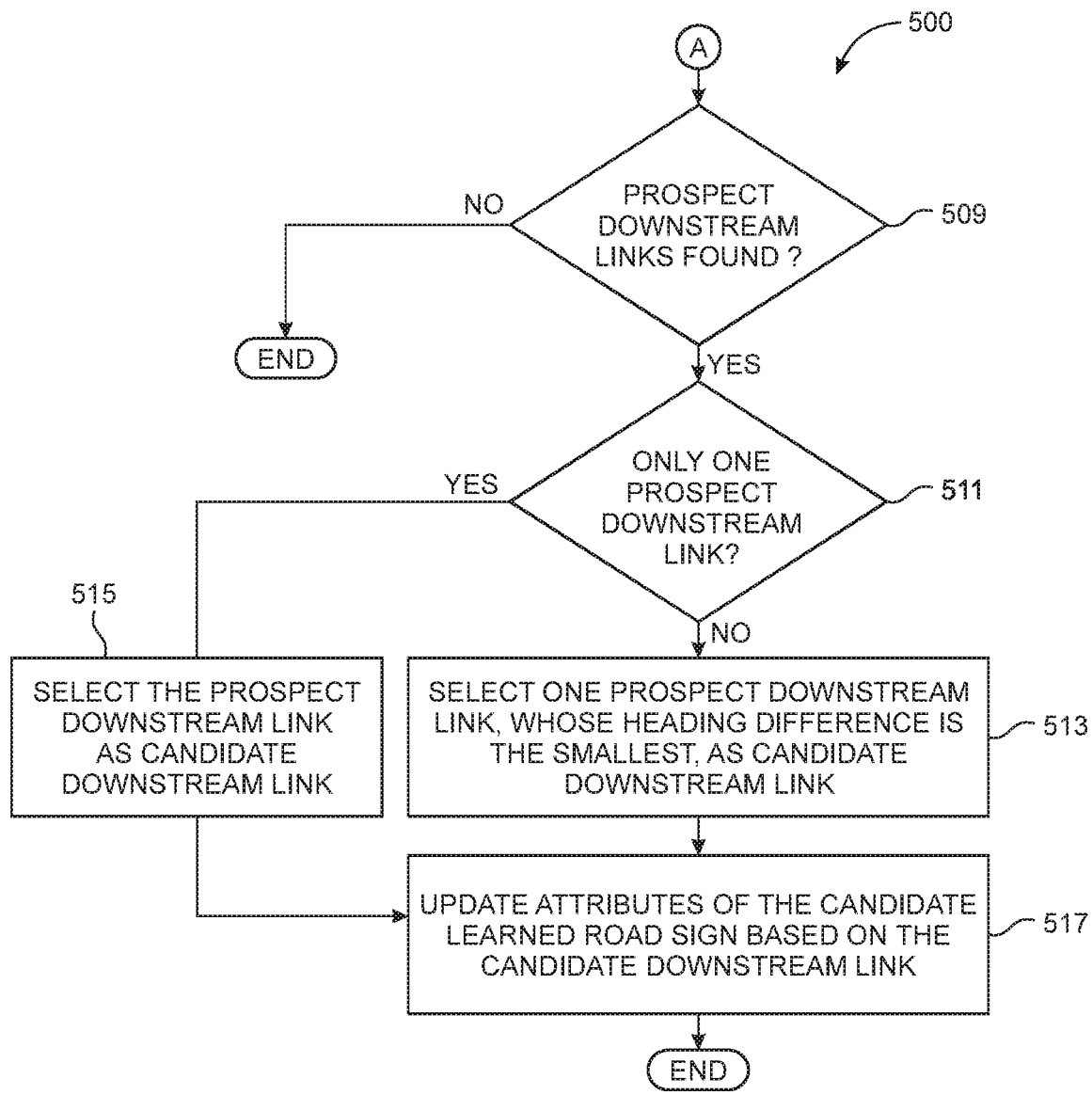
Figure 6:
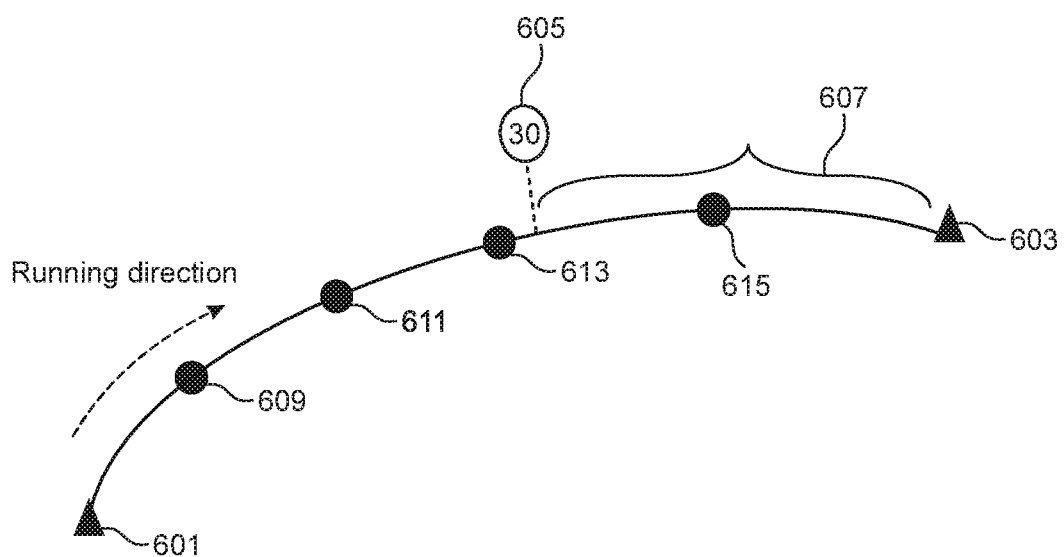
Figure 7:
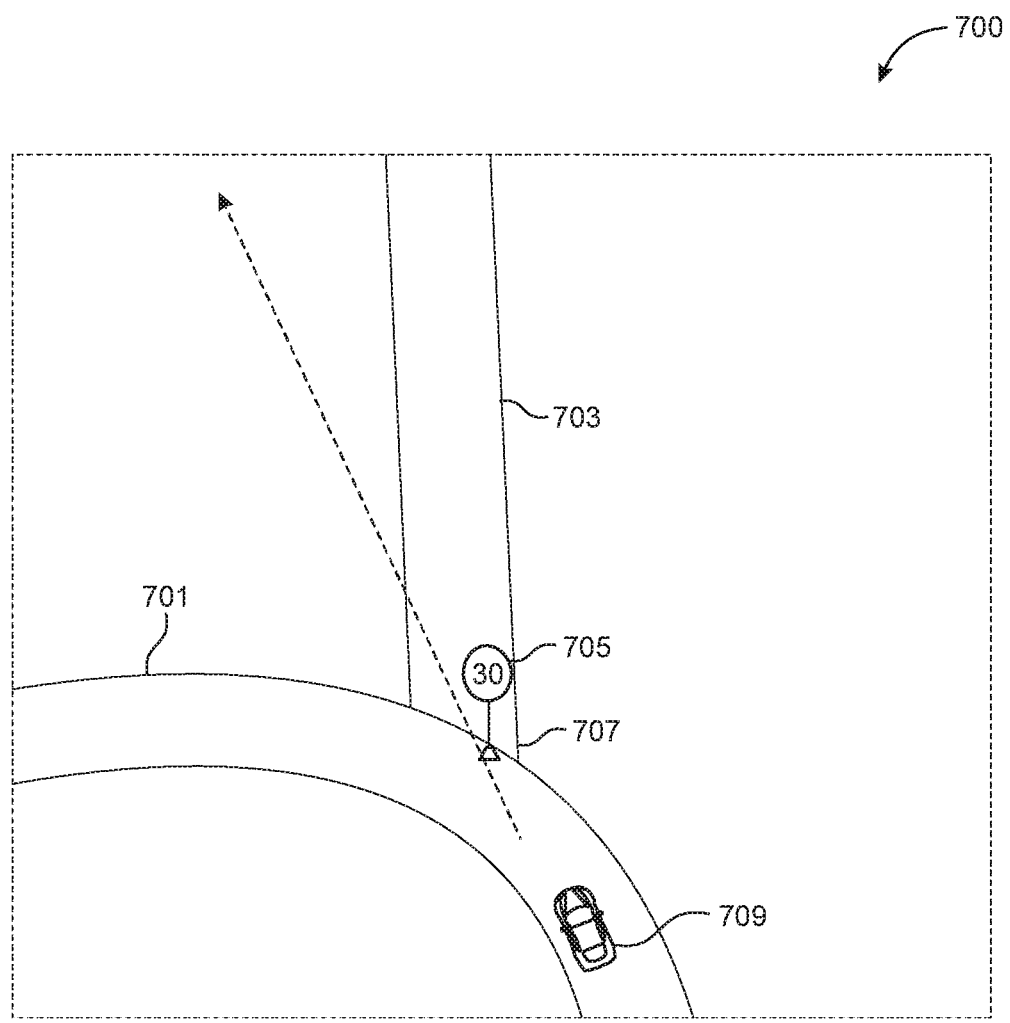

Having thus described example embodiments of the invention in general terms, reference will now be made to the accompanying drawings, which are not necessarily drawn to scale, and wherein:

FIG. 1 illustrates a schematic block diagram of a communication diagram, in accordance with one or more example embodiments;

FIG. 2 exemplarily illustrates a block diagram of a system for updating one or more attributes of a learned road sign (LRS), in accordance with one or more example embodiments;

FIG. 3 illustrates a block diagram of a working environment of the system exemplarily illustrated in FIG. 2, for updating one or more attributes of a learned road sign (LRS), in accordance with one or more example embodiments;

FIG. 4 illustrates a flowchart illustrative of a method for updating one or more attributes of a learned road sign (LRS), in accordance with one or more example embodiments;

FIGS. 5A and 5B illustrate a schematic block diagram depicting workflow of the system exemplarily illustrated in FIG. 2, in accordance with one or more example embodiments;

FIG. 6 illustrates a schematic diagram of a map-matched link, in accordance with one or more example embodiments; and FIG. 7 illustrates an exemplary scenario for updating one or more attributes of a learned road sign (LRS) by the system exemplarily illustrated in FIG. 2, in accordance with one or more example embodiments.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. Also, reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced item. Moreover, various features are described which may be exhibited by some embodiments and not by others. Similarly, various requirements are described which may be requirements for some embodiments but not for other embodiments. As used herein, the terms "data," "content," "information," and similar terms may be used interchangeably to refer to data capable of being displayed, transmitted, received and/or stored in accordance with embodiments of the present invention. Thus, use of any such terms should not be taken to limit the spirit and scope of embodiments of the present invention.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "link" may be used to refer to any connecting pathway including but not limited to a roadway, a highway, a freeway, an expressway, a lane, a street path, a road, an alley, a controlled access roadway, a free access roadway, and the like.

The term "route" may be used to refer to a path from a source location to a destination location on any link.

The term "road sign" may be used to refer to signs positioned at the side of or above roads to provide information to road users. The road signs may include without limitation, one or more speed limit signs, street name signs, school signs, 'men at work' signs, an underpass sign, an overpass sign and the like.

The term 'road sign observation' may be used to refer to observation captured about one or more road signs and the like.

The term 'road intersection' may be used to refer to a junction where two or more roads meet or cross.

The term 'user equipment' may be used to refer to any user accessible device such as a mobile phone, a smartphone, a portable computer, and the like that is portable in itself or as a part of another portable object.

End of Definitions

FIG. 1 illustrates a schematic block diagram of a communication diagram 10, in accordance with one or more example embodiments. One or more road signs may exist at a road intersection. The one or more road signs may comprise, for example, speed limit sign, street name sign, school sign, 'men at work' sign, an underpass sign, an overpass sign, and the like. The road signs may have corresponding locations, corresponding headings, corresponding sign types, and corresponding sign values. In an embodiment, a speed limit sign at a road intersection may have corresponding sign sides indicating the position of the speed limit sign relative to a pathway, in addition to the corresponding locations, corresponding headings, corresponding sign types, and corresponding sign values. A plurality of road sign observations are captured by running vehicles and road signs are learnt from the plurality of road sign observations. The locations of the road signs are recorded as those of the vehicles when the vehicles recognize and track the signs. The detection of the road signs are discrete observations. That is, the detection of the road signs by the vehicles is point based observations indicating location co-ordinates of markings within an area.

The road signs may be static road signs or variable road signs positioned at the road intersection. Sign values of variable road signs may vary based on traffic conditions in vicinity of the variable road signs, and may be indicated via display devices such as, LCD display panels, LED panels, etc. Referring to FIG. 1, system 100 may be communicatively coupled to at least one user equipment 101A via a network 103. The system 100 may further be in communication with a mapping platform 105, via the network 103. At least one user equipment 101B may be communicatively connected to an OEM cloud 107 which in turn may be accessible to the system 100 via the network 103. In some example embodiments, one or more of the user equipment 101A and 101B may be a vehicle or a part/component of the vehicle. Such a vehicle may be any of a manually driven vehicle, a semi-autonomous vehicle, or a fully autonomous vehicle.

The user equipments (101A and 101B) may capture road sign observations of road signs along one or more roads, including capturing the road sign observations at a road intersection. Additionally or optionally, the user equipment 101 may comprise a navigation application, that may be configured to provide route guidance and navigation related functions. The user equipments (101A and 101B) may comprise or may be coupled with sensors to capture the road sign observations, such as a camera for capturing images of road signs along the one or more roads, one or more position sensors to obtain location data of locations at which the images are captured, one or more orientation sensors to obtain heading data of the user equipments (101A, 101B) at the locations at which the images are captured, one or more motion sensors to obtain speed data of the user equipments (101A and 101B) at the locations at which the images are captured. In some example embodiments, the user equipments (101A and 101B) may comprise LIDAR sensors for capturing the road sign observations.

Throughout this disclosure, an autonomous vehicle may be referred to as a robot vehicle or an automated vehicle. The autonomous vehicle may include passengers, but not necessarily a driver. These autonomous vehicles may park themselves or move cargo between locations with or without a human operator. The autonomous vehicles may include multiple modes and transition between the modes. The vehicles may also be driven in a manual mode in which a human operator exercises a degree of control over movement of a vehicle. The vehicles may also include a completely driverless mode. Other levels of automation may also be possible within the scope of this disclosure.

In some example embodiments, the user equipments (101A and 101B) may correspond to devices installed in a vehicle such as an infotainment system, a control system of the electronics, or a mobile phone connected with the control electronics of the vehicle. In some example embodiments, the system 100 may directly obtain the road sign observations from the user equipment 101A. In some example embodiments, the road sign observations may be accessible to the system 100 from the OEM cloud 107 associated with the user equipment 101B. For this purpose, the user equipment 101B may upload the captured road signs to the OEM cloud 107 sequentially or in batches which may then be bundled by the OEM cloud 107 for access by the system 100.

In some example embodiments, the user equipments (101A and 101B) may include a mobile computing device, such as, a laptop computer, a tablet computer, a mobile phone, a smart phone, a navigation unit, a personal data assistant, a watch, a camera, or the like. Additionally or alternatively, the user equipments (101A and 101B) may include a fixed computing device, such as, a personal computer. The user equipment 101A may be configured to access a mapping database 105A of the mapping platform 105 via a processing component 105B through, for example, a user interface of a mapping application, such that the user equipment 101A may provide navigational assistance to the user among other services provided through access to the mapping platform 105.

The network 103 may be a wired communication network, a wireless communication network, or any combination of wired and wireless communication networks, such as, cellular networks, Wi-Fi, internet, local area networks, or the like. In one embodiment, the network 103 may include one or more networks, such as, a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

As exemplarily illustrated, the map database 105A of the mapping platform 105, which may store node data, road segment data or link data, point of interest (POI) data, posted signs related data, or the like. The map database 105A may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road/link data and the node data may represent a road network, such as, used by vehicles, for example, cars, trucks, buses, motorcycles, and/or other entities. Optionally, the map database 105A may contain path segment and node data records or other data that may represent pedestrian paths or areas in addition to or instead of the vehicle road record data, for example. The road/link segments and nodes may be associated with attributes, such as geographic coordinates, street names, address ranges, speed limits, road signs and data thereof, turn restrictions at intersections, and other navigation related attributes, as well as POIs, such as, fueling stations, hotels, restaurants, museums, stadiums, offices, auto repair shops, buildings, stores, parks, etc. The map database 105A may include data about the POIs and their respective locations in the POI records.

The map database 105A may additionally include data about places, such as, cities, towns, or other communities, and other geographic features such as bodies of water, mountain ranges, etc. Such place or feature data may be part of the POI data or may be associated with POIs or POI data records (such as a data point used for displaying or representing a position of a city). In addition, the map database 105A may include event data (e.g., traffic incidents, construction activities, scheduled events, unscheduled events, etc.,) associated with the POI data records or other records of the map database 105A associated with the mapping platform 105. The map database 105A may additionally include data related to road signs, such as, location of the road signs, heading of the road signs, diversions to be caused as indicated in the road signs, suggested routes to avoid congestion to be caused as indicated in the road signs, etc. The data related to road signs may be fetched from external systems, such as, roadwork planning system of the municipalities.

A content provider, such as, a map developer may maintain the mapping platform 105. By way of example, the map developer may collect geographic data to generate and enhance the mapping platform 105. There may be different ways used by the map developer to collect data. These ways may include obtaining data from other sources, such as municipalities or respective geographic authorities. In addition, the map developer may employ field personnel to travel by vehicle along roads throughout the geographic region to observe features and/or record information about them, for example. Crowdsourcing of geographic map data may also be employed to generate, substantiate, or update map data. For example, sensor data from a plurality of data probes, which may be, for example, vehicles traveling along a road network or within a venue, may be gathered and fused to infer an accurate map of an environment in which the data probes are moving. Such sensor data may be updated in real time such as on an hourly basis, to provide accurate and up to date map data. The sensor data may be from any sensor that may inform a map database of features within an environment that are appropriate for mapping. For example, motion sensors, inertia sensors, image capture sensors, proximity sensors, LIDAR (light detection and ranging) sensors, ultrasonic sensors etc. The gathering of large quantities of crowd-sourced data may facilitate the accurate modeling and mapping of an environment, whether it is a road segment or the interior of a multi-level parking structure. Also, remote sensing, such as aerial or satellite photography, may be used to generate map geometries directly or through machine learning as described herein.

The map database 105A of the mapping platform 105 may be a master map database stored in a format that facilitates updating, maintenance, and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, for example. The navigation-related functions may correspond to vehicle navigation, pedestrian navigation, navigation to a favored parking spot or other types of navigation. While example embodiments described herein generally relate to vehicular travel and parking along roads, example embodiments may be implemented for bicycle travel along bike paths and bike rack/parking availability, boat travel along maritime navigational routes including dock or boat slip availability, etc. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

In some embodiments, the map database 105A may be a master geographic database configured at a server side, but in alternate embodiments, a client side map database 105A may represent a compiled navigation database that may be used in or with end user devices (e.g., the user equipment 101A and 101B) to provide navigation, speed adjustment and/or map-related functions for navigation assistance. The map database 105A may be used with the end user device, that is, the user equipment 101A to provide the user with navigation features. In such a case, the map database 105A may be downloaded or stored on the user equipment 101A which may access the mapping platform 105 through a wireless or wired connection, over the network 103.

FIG. 2 exemplarily illustrates a block diagram of the system 100 for updating attributes of a learned road sign (LRS) for navigation assistance to a user of an autonomous or semi-autonomous vehicle. The system 100 may include a processing means, such as, at least one processor 201, a storage means, such as, at least one memory 203, and a communication means, such as, at least one communication interface 205. The processor 201 may retrieve computer program code instructions that may be stored in the memory 203 for execution of the computer program code instructions.

The processor 201 may be embodied in a number of different ways. For example, the processor 201 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 201 may include one or more processing cores configured to perform independently. A multi-core processor may enable multiprocessing within a single physical package. Additionally or alternatively, the processor 201 may include one or more processors configured in tandem via the bus to enable independent execution of instructions, pipelining and/or multithreading.

Additionally or alternatively, the processor 201 may include one or more processors capable of processing large volumes of workloads and operations to provide support for big data analysis. In an example embodiment, the processor 201 may be in communication with the memory 203 via a bus for passing information among components of the system 100. The memory 203 may be non-transitory and may include, for example, one or more volatile and/or non-volatile memories. In other words, for example, the memory 203 may be an electronic storage device (for example, a computer readable storage medium) comprising gates configured to store data (for example, bits) that may be retrievable by a machine (for example, a computing device like the processor 201). The memory 203 may be configured to store information, data, content, applications, instructions, or the like, for enabling the apparatus to carry out various functions in accordance with an example embodiment of the present invention. For example, the memory 203 may be configured to buffer input data for processing by the processor 201. As exemplarily illustrated in FIG. 2, the memory 203 may be configured to store instructions for execution by the processor 201. As such, whether configured by hardware or software methods, or by a combination thereof, the processor 201 may represent an entity (for example, physically embodied in circuitry) capable of performing operations according to an embodiment of the present invention while configured accordingly. Thus, for example, when the processor 201 is embodied as an ASIC, FPGA or the like, the processor 201 may be specifically configured hardware for conducting the operations described herein.

Alternatively, as another example, when the processor 201 is embodied as an executor of software instructions, the instructions may specifically configure the processor 201 to perform the algorithms and/or operations described herein when the instructions are executed. However, in some cases, the processor 201 may be a processor specific device (for example, a mobile terminal or a fixed computing device) configured to employ an embodiment of the present invention by further configuration of the processor 201 by instructions for performing the algorithms and/or operations described herein. The processor 201 may include, among other things, a clock, an arithmetic logic unit (ALU) and logic gates configured to support operation of the processor 201.

In some embodiments, the processor 201 may be configured to provide Internet-of-Things (IoT) related capabilities to users of the system 100 disclosed herein. The IoT related capabilities may in turn be used to provide smart city solutions by providing real time parking updates, big data analysis, and sensor-based data collection by using the cloud based mapping system for providing navigation and parking recommendation services. In some embodiments, the system 100 may be configured to provide an environment for development of parking strategy recommendation solutions for navigation systems in accordance with the embodiments disclosed herein. The environment may be accessed using the communication interface 205. The communication interface 205 may provide an interface for accessing various features and data stored in the system 100.

The communication interface 205 may comprise input interface and output interface for supporting communications to and from the system 100. The communication interface 205 may be any means such as a device or circuitry embodied in either hardware or a combination of hardware and software that is configured to receive and/or transmit data to/from a communications device in communication with the system 100. In this regard, the communication interface 205 may include, for example, an antenna (or multiple antennae) and supporting hardware and/or software for enabling communications with a wireless communication network. Additionally or alternatively, the communication interface 205 may include the circuitry for interacting with the antenna(s) to cause transmission of signals via the antenna(s) or to handle receipt of signals received via the antenna(s). In some environments, the communication interface 205 may alternatively or additionally support wired communication. As such, for example, the communication interface 205 may include a communication modem and/or other hardware and/or software for supporting communication via cable, digital subscriber line (DSL), universal serial bus (USB) or other mechanisms.

FIG. 3 describes a block diagram of a working environment 300 of the system 100 exemplarily illustrated in FIG. 2, for updating map data, in accordance with an exemplarily embodiment. There may be a road sign, for example, a speed limit sign positioned at a road intersection of two or more routes. The system 100 may update attributes corresponding to the road sign positioned at the road intersection. In some example embodiments, there may be more than one road sign located at the road intersection, and the system 100 may update the attributes of the learned road signs (LRSs) accordingly. The system 100 may be communicatively coupled to one or more user equipment 301A and 301B. In the exemplary environment 300 of FIG. 3, the user equipment 301A may be a smartphone that runs an application 303, such as, a navigation application on a user interface (UI) 305. The user equipment 301B may be considered to be a vehicle, such as, an autonomous, semi-autonomous, or a manually driven vehicle. An autonomous vehicle, as used throughout this disclosure, may refer to a vehicle having autonomous driving capabilities at least in some conditions. Although two user equipment are described herein, it may be contemplated that fewer or a greater number of user equipment may be present.

In one embodiment, the system 100 may communicate with the user equipments 301A and 301B (through, for example, the communication interface 205, to obtain road sign observations associated with one or more of road signs, at a road intersection. In an alternative embodiment, the system 100 may obtain, via the communication interface 205, some or all of the road sign observations from the OEM cloud 107 over the network 103. The processor 201 may be further configured to cluster the road sign observations to generate clusters and map-match the generated clusters to a plurality of links. In one or more example embodiments, the processor 201 may obtain one or more map-matched links corresponding to one or more road signs from the map database 105A over the network 103.

The road sign observations may refer to sensor data collected from vehicles as sensors (for example, vehicle 301B). The sensor data may be generated on detection of static road signs positioned along the pathways. In an embodiment, the road sign observations may refer to sensor data from digital or dynamic road signs, such as, LED panels, LCD panels, etc., positioned along the pathways. The road sign observations may further comprise time of capture of the road sign observations as a time stamp associated with each of the road sign observations. The road sign observations (sensor data) may further comprise heading data of each of the road signs. Such heading data may be obtained by suitable orientation sensors installed in the vehicle 301B. A plurality of vehicles, such as, 301B passing by the location of each of the road signs on the pathway, may generate a plurality of road sign observations for each of the road signs. Thus, each road sign observation may be different from other road sign observation based on location data, heading data, observation value, and observation type, and time of capture of the road sign from a vehicle. The road sign observations may further comprise location data of the vehicle at the time of capture of each of the road signs. Such location data may be acquired by suitable location sensors installed in the vehicle 301B. The location of the road sign may thus correspond to the location of capture of the road sign from the vehicle 301B.

In some example embodiments, the road sign observations may further comprise motion data such as speed data of the vehicles such as the vehicle 301B at the instance of capture of each of the road sign observations. Such motion data may be captured by one or more motion sensors (for example accelerometer) of the vehicle 301B. The vehicle 301B may thus include one or more sensors such as a camera, an acceleration sensor, a gyroscopic sensor, a LIDAR sensor, a proximity sensor, a motion sensor, a speed sensor and the like. The sensors may primarily be used for detecting road signs, determining speed and position of the vehicle 301B.

In one or more embodiments, the sensors may be built-in or embedded into or within interior of the vehicle 301B. In some embodiments, the vehicle 301B may use communication signals for position determination. The vehicle 301B may receive location data from a positioning system, a Global Navigation Satellite System, such as, Global Positioning System (GPS), Galileo, GLONASS, BeiDou, etc., cellular tower location methods, access point communication fingerprinting, such as, Wi-Fi or Bluetooth based radio maps, or the like. The data collected by the sensors may be used to gather information related to a road sign, for example, a speed limit sign. In some embodiments, the vehicle 301B may have sensors positioned on or within itself and the sensors may provide data indicating a location and speed of the vehicle 301B, heading data associated with the vehicle 301B, sign types of the road signs, and sign values of the road signs along pathways. The data collected by the sensors may be transmitted to the OEM cloud 107. The sensors, such as, the accelerometer, the gyroscope, and the like can be used to detect the location and heading of the vehicle, enabling a derived location and heading for the detected road sign. The observation type may be a speed sign, a road sign indicating a roadwork zone, a road sign indicating a diversion ahead, a road sign indicating a speed bump ahead, etc. The observation value may indicate sign value associated with each of the road sign, such as, speed limit value, etc.

In one embodiment, the user device or the user equipment 301A may be an in-vehicle navigation system, such as, an infotainment system, a personal navigation device (PND), a portable navigation device, a cellular telephone, a smart phone, a personal digital assistant (PDA), a watch, a camera, a computer, a workstation, and/or other device that may perform navigation-related functions, such as digital routing and map display. An end user of the user equipment 301A may request for navigation and map functions such as guidance and map display, for example, and for determination of one or more personalized routes or route segments based on one or more calculated and recorded routes, according to some example embodiments. In some embodiments, the system 100 may notify a user of the user equipment 301A about update of the attributes of the learned road sign at the road intersection. The update of the attributes of the learned road sign is next discussed in detail in the subsequent embodiments.

Probe data collected by the vehicle 301B may be representative of the location of the vehicle 301B at a respective point in time and may be collected while the vehicle 301B is traveling along a route. While probe data is described herein as being vehicle probe data, example embodiments may be implemented with pedestrian probe data, marine vehicle probe data, or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal, longitudinal position, and/or height, GNSS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The vehicle 301B may comprise any device capable of collecting the aforementioned probe data.

The working environment 300 may further include a services platform 307, which may be used to provide navigation related functions and services 309a-309i to the application 303 running on the user equipment 301A. The services 309a-309i may include such as navigation functions, speed adjustment functions, traffic related updates, weather related updates, warnings and alerts, parking related services, indoor mapping services and the like. The services 309a-309i may be provided by a plurality of content providers 311a-311j. In some examples, the content providers 311a-311j may access various SDKs from the services platform 307 for implementing one or more services. In an example, the services platform 307 and the mapping platform 105 may be integrated into a single platform to provide a suite of mapping and navigation related applications for OEM devices, such as the user equipment 301A. The user equipment 301A may be configured to interface with the services platform 307, the content provider's services 311a-311j, and the mapping platform 105 over the network 103. Thus, the mapping platform 105 and the services platform 307 may enable provision of cloud-based services for the user equipment 301A, such as, storing the road sign observations in an OEM cloud 107 in batches or in real-time and retrieving the stored road sign observations for updating the map data.

On updating the map data, the system 100 may provide navigation assistance to the vehicle 301B or to user of the vehicle 301B. The different representations of the navigation assistance may be in the form of a map with color coded or patterned road links indicating traffic conditions on the route, locations of road signs at road intersections, etc. In an embodiment, the system 100 may receive destination information from the user on the user interface 305 of the user equipment 301A. In some example embodiments, the system 100 may notify the users of the vehicles, similar to 301B, via the user interface 305 of the user equipment 301A about a roadwork zone ahead based on the validated routes. In some example embodiments, the system 100 may render notification about changes in navigation routes due to updates in the map data, broken down vehicles, cones, etc., in mobile applications or navigation applications, such as, 303 used by the users.

In some embodiments, the system 100 may be configured to provide a repository of algorithms, in the memory 203, for implementing a plurality of location based services for navigation systems. For example, the system 100 may include algorithms related to geocoding, routing (multimodal, intermodal, and unimodal), clustering algorithms, machine learning in location based solutions, natural language processing algorithms, artificial intelligence algorithms, and the like. The data for the system 100 may be collected using a plurality of technologies including but not limited to drones, sensors, connected cars, cameras, probes, chipsets and the like. The collected data may be processed by the processor 201 of the system 100 to validate one or more routes according to the embodiments disclosed herein.

As noted above, the system 100 and/or the mapping platform 105 may be embodied by a processing component. However, in some embodiments, the system 100 and/or the mapping platform 105 may be embodied as a chip or chip set. In other words, the system 100 and/or the mapping platform 105 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The system 100 may therefore, in some cases, be configured to implement an example embodiment of the present invention on a single "system on a chip." As such, in some cases, a chip or chipset may constitute a means for performing one or more operations for providing the functionalities described herein.

The user interface 305 of the user equipment 301A may in turn be in communication with the system 100 to provide output to the user and, in some embodiments, to receive an indication of a user input. In some example embodiments, the user interface 305 may communicate with the system 100 and may display input and/or output of the system 100. As such, the user interface 305 may include a display and, in some embodiments, may also include a keyboard, a mouse, a joystick, a touch screen, touch areas, soft keys, one or more microphones, a plurality of speakers, or other input/output mechanisms. In one embodiment, the system 100 may comprise user interface circuitry configured to control at least some functions of one or more user interface elements such as a display and, in some embodiments, a plurality of speakers, a ringer, one or more microphones and/or the like. The processor 201 and/or user interface circuitry comprising the processor 201 may be configured to control one or more functions of one or more user interface elements through computer program instructions (for example, software and/or firmware) stored on a memory accessible to the processor 201. In some example embodiments, the processor 201 may be configured to provide a method for updating attributing of a learned road sign, as will be discussed in conjunction with FIG. 4 as below.

FIG. 4 illustrates a flowchart 400 illustrative of a method for updating one or more attributes of a learned road sign (LRS), according to example embodiments of the present invention. It will be understood that each block of the flowchart 400 of the method may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 203 of the system 100, employing an embodiment of the present invention and executed by a processor 201 of the system 100. As will be appreciated, any such computer program instructions may be loaded onto a computer or other programmable apparatus (for example, hardware) to produce a machine, such that the resulting computer or other programmable apparatus implements the functions specified in the blocks of the flowchart 400. These computer program instructions may also be stored in a computer-readable memory that may direct a computer or other programmable apparatus to function in a particular manner, such that the instructions stored in the computer-readable memory produce an article of manufacture, the execution of which implements the function specified in the blocks of the flowchart 400. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the blocks of the flowchart 400.

Accordingly, blocks of the flowchart 400 support combinations of means for performing the specified functions and combinations of operations for performing the specified functions. It will also be understood that one or more blocks of the flowchart 400, and combinations of blocks in the flowchart 400, may be implemented by special purpose hardware-based computer systems which perform the specified functions, or combinations of special purpose hardware and computer instructions.

The method illustrated by the flowchart 400 of FIG. 4 for updating the attributes of the LRS may include, at 401, obtaining by a processor (e.g. processor 201), sensor data associated with the LRS. The sensor data may comprise a link ID of a map-matched link of the LRS, a map-matched location of the LRS and a first heading of the map-matched link of the LRS. The on-route distance criterion may comprise a condition that the on-route distance between the map-matched location of the LRS and a link end location of the map-matched link of the LRS is less than a threshold distance. The link end location corresponds to one of a reference node or a non-reference node of the map-matched link based on the first heading and a driving direction of the map-matched link. The downstream link count criterion may be that the map-matched link of the LRS comprises at least two connected downstream links in immediate downstream of the map-matched link. Further, at 403, the method may comprise determining by the processor, a plurality of first downstream links associated with the LRS, based on the sensor data. The plurality of the first downstream links may be in immediate downstream of the map-matched link. The method, at 405, may comprise selecting a candidate downstream link by the processor, from the plurality of first downstream links based on a heading difference between the LRS and each of the plurality of first downstream link. Further, the method, at 407, may comprise updating the one or more attributes of the LRS, based on the candidate downstream link. The one or more attributes of the LRS comprises the link ID of the map-matched link of the LRS and the map-matched location of the LRS.

Additionally, various other steps not shown in FIG. 4 may also be included in the method illustrated in the flowchart 400. The method of determining the plurality of the first downstream links associated with the LRS, as depicted in step 403, may further comprise searching in downstream of the LRS based on the link ID of the map-matched link. The plurality of first downstream links has a common start node.

The method of selecting the candidate downstream link from the plurality of first downstream links, as depicted in 405, may further comprise obtaining a second heading of each of the plurality of first downstream links based on link data of each of the plurality of first downstream links. Upon obtaining the second heading of each of the plurality of first downstream links, the method of selecting the candidate downstream link from the plurality of first downstream links may further comprise determining the heading difference between the LRS and each of the plurality of first downstream link, based on the first heading of the map-matched link of the LRS and the second heading of each of the plurality of first downstream links. Further, the method of selecting candidate downstream link may comprise selecting the candidate downstream link based on the heading difference of the candidate downstream link being the smallest among the plurality of first downstream links.

In an example embodiment, a system for performing the method of FIG. 4 above may comprise a processor (e.g. the processor 201) configured to perform some or each of the operations (401-407) described above. The processor may, for example, be configured to perform the operations (401-407) by performing hardware implemented logical functions, executing stored instructions, or executing algorithms for performing each of the operations. Alternatively, the system may comprise means for performing each of the operations described above. In this regard, according to an example embodiment, examples of means for performing operations 401-407 may comprise, for example, the processor 201 and/or a device or circuit for executing instructions or executing an algorithm for processing information as described above.

On implementing the method illustrated in the flowchart 400 disclosed herein, the end result generated by the system 100 is tangible update of one or more attributes of learned road signs (LRSs) positioned at road intersections among routes, and thus update of map data. The update of attributes of learned road signs (LRSs) situated at road intersections aids in smooth and well-planned navigation of vehicles, whenever the vehicles arrive at the intersections. At a road intersection, autonomous vehicles may detect a learned road sign inaccurately, that is, the autonomous vehicles may perceive the learned road sign to be applicable for a wrong link, and thereby may follow inaccurate navigation. In the process of updating the attributes of learned road signs, the system 100 may overcome failure in accurate detection of learned road signs at road intersections by updating attributes of the learned road signs from the obtained road sign observations.

FIGS. 5A and 5B illustrate a schematic block diagram 500 depicting workflow of the system 100 exemplarily illustrated in FIG. 2, in accordance with one or more example embodiments. As shown in the block diagram 500, at step 501, the processor 201 may obtain sensor data associated with a candidate learned road sign (LRS) from the map database 105A. The sensor data may comprise a link ID of a map-matched link of the candidate LRS, a map-matched location of the candidate LRS and first heading of the map-matched link of the candidate LRS (or heading of the candidate LRS). The processor 201 may extract the sensor data according to one or more of two conditions: first, an on-route distance being less than a threshold distance value and second, the map-matched link of the candidate LRS comprising at least two downstream links in immediate downstream of the map-matched link. These two conditions determine that the candidate LRS may be positioned at a road intersection of two or more routes. The processor 201 may calculate the on-route distance between the candidate LRS and a link end of the map-matched link. In some example embodiments, the threshold distance value may be configurable. In some example embodiments, a link end refers to a reference or non-reference node of the map-matched link according to the heading of the learned road sign associated with the map-matched link and a driving direction of the map-matched link.

Further, as discussed previously, the map-matched links may have a number of connecting downstream links in downstream of it. At step 503, the processor 201 may search for a plurality of first downstream links in downstream of the map-matched link, based on link features of the map-matched link. The link features of the map-matched link may refer to a functional class of the map-matched link, a link start location and a link end location of the map-matched link, a link downstream heading of the map-matched link, and a link length of the map-matched link.

Upon finding the first downstream links, the processor 201, at step 505, may obtain a second heading of each first downstream link from the map database 105A based on link data of each first downstream link. In one or more example embodiments, the link data comprises link ID, map-matched location, and second heading of each first downstream link. At step 507, the processor 201 may select one or more prospect downstream links. In order to select the one or more prospect downstream links, the processor 201 may utilize the sensor data. The processor 201 may compare the obtained second heading of each first downstream link with the heading of the candidate LRS and compute a heading difference between the two headings. The processor 201 may select those first downstream links, for which the heading difference is less than a threshold heading value, as prospect downstream links. From this step, the processor 201 may consider only the prospect downstream links out of all searched downstream links for further processing. In some example embodiments, the threshold heading value may be configurable.

Further, at step 509, the processor 201 may examine whether or not one or more prospect downstream links are selected for the candidate LRS. That is, if at step 507, for no prospect downstream link, the heading difference is found to be less than the threshold heading difference value, the processor 201 may select no first downstream link as prospect downstream link. In such a scenario, the processor 201 may end the workflow for the candidate LRS at step 509 and may initiate the workflow from step 501 for a different LRS. However, the processor 201 may continue the workflow for the candidate LRS, if at step 507, at least one prospect downstream link is selected. In some example embodiments, the threshold heading difference value may be configurable.

Further, the processor 201, at step 511, may check if the number of prospect downstream links is one or more than one. If more than one prospect downstream link is selected at step 507, the processor 201, at step 513, may compare the heading difference of each prospect downstream link with each other, and may designate a prospect downstream link for which the heading difference is the smallest, as candidate downstream link. However, if only one prospect downstream link is selected at the step 511, the processor 201 at step 515, may select that prospect downstream link as candidate downstream link. In continuation of the workflow for the candidate LRS, furthermore, at step 517, the processor 201 may update attributes of the candidate LRS based on the candidate downstream link. The attributes of the LRS may comprise the link ID of the map-matched link of the LRS and the map-matched location of the LRS. The processor 201 may change link ID of the LRS from link ID of the map-matched link to LINK ID of the candidate downstream link. Further, the processor 201 may update the map-matched location of the LRS to a link start location of the candidate downstream link. As already mentioned, the processor 201 may execute the steps illustrated in FIGS. 5A and 5B iteratively for more than one extracted LRSs. At the end of each iteration, the processor 201 may update location of each LRS based on a candidate downstream link selected in each iteration.

FIG. 6 illustrates a schematic diagram of a map-matched link, in accordance with one or more example embodiments. The processor 201 may extract one or more map-matched links corresponding to one or more LRSs, as exemplarily illustrated in FIGS. 5A and 5B. The map-matched links are formed from the road sign observations corresponding to a cluster. Each of the map-matched links has a corresponding LINK ID. As exemplarily illustrated in FIG. 6, a map-matched link has a start node with link start location 601, an end node with link end location 603 and multiple shape points with corresponding link shape locations. As exemplarily illustrated in FIG. 6, the map-matched link has four shape points with corresponding shape locations 609, 611, 613, and 615. Considering 605 to be location of a LRS, the distance between the location of the LRS 605 and the link end location 603 may correspond to the on-route distance 607 between the LRS and a link end location of the map-matched location.

FIG. 7 illustrates an exemplary scenario 700 for updating attributes of a LRS by the system exemplarily illustrated in FIG. 2, in accordance with one or more example embodiments. As shown in the scenario 700, a speed limit sign 705 indicating a maximum safe and acceptable speed for a road 703 for favorable weather and visibility, may be positioned at a road intersection 707 of a road 701 and the road 703. In context of the exemplary scenario 700, the vehicle 709 may be an autonomous or a semi-autonomous vehicle. As shown in the scenario 700, the speed limit sign 705 may be closely placed at the road intersection 707. As a result, in the map database 105A, the speed limit sign 705 may be assigned to LINK ID of a first map-matched link corresponding to the road 701, and map-matched location of the speed limit sign 705 may be stored as being on the first map-matched link. Therefore, when the vehicle 709 arrives at the road intersection 707, the vehicle 709 may detect the speed limit sign 705 being applicable for the road 701. Considering the vehicle 709 further intends to travel along road 703, it may be unfavorable for the vehicle 709 if the vehicle 709 runs at a speed more than the maximum permissible speed as indicated in the speed limit sign 705. However, as per the vehicle's observation, the speed limit sign 705 may be applicable for the road 701. Implementing the system 100 in this scenario may address this problem. The system 100 may compute distance between the map-matched location of the speed limit sign 705 and a link end of the first map-matched link. The system 100 may find the distance less than a threshold value, since the speed limit sign 705 in this scenario is closely positioned at the road intersection 707.

Further, the system 100 may search for connecting first downstream links in downstream of the first map-matched link corresponding to the road 701. Upon finding the first downstream links, the system 100 may determine a heading difference between a first heading of the speed limit sign 705 and a second heading of each of the first downstream links, as explained in reference to FIGS. 5A and 5B. The system 100 may obtain heading of the speed limit sign 705 from a map database, for example the map database 105A. Further, the system 100 may select a second map-matched link corresponding to the road 703 as a candidate downstream link based on the heading difference, from the first downstream links found in downstream of the first map-matched link, as explained previously with reference to FIGS. 5A and 5B. In this exemplary scenario 700, since the system 100 may find the candidate downstream link (which is the second map-matched link corresponding to the road 703), and the system 100 may update attributes of the speed limit sign 705 in the map database 105A accordingly. As per the updated attributes, the speed limit sign 705 may be assigned to a LINK ID of the second map-matched link and the map-matched location of the speed limit sign 705 may be a link start location of the second map-matched link. The vehicle 709 may thus obtain accurate navigational assistance data indicating that the speed limit sign 705 is applicable for the road 703, since the updated attributes may read that the sign 705 is on the road 703. Therefore, the vehicle 709 may now navigate through the road 703 within the permissible speed limit.

In this way, example embodiments of the present invention may result in update of attributes corresponding to learned road signs positioned at a road intersection. The present invention aids in determining accurate location of a road sign positioned at a road intersection. In many instances, capturing of road sign observations may be inaccurate and location of the learned road signs may be erroneously determined. Specifically, as discussed previously, for road sign(s) positioned at an intersection of two or more roads, due to the road sign(s) being positioned closely at the intersection, clustering of the road sign observations corresponding to the road sign(s) may be inaccurate, and hence, learned road sign(s) may be assigned to a wrong map-matched link. For example, for a speed funnel at a road intersection indicating a roadwork zone ahead, if the locations speed limit signs of the speed funnel on a road are not accurately determined by an autonomous vehicle, the navigation assistance provided to the vehicle may be troublesome. In such a scenario, updating attributes of learned road signs may mitigate road accidents.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A system for updating one or more attributes of a learned road sign (LRS), comprising:
at least one non-transitory memory configured to store computer program code instructions; and
at least one processor configured to execute the computer program code instructions to:
receive, via one or more sensors from road sign observations, data associated with the LRS, a map-matched link associated with the LRS from a map database, or a combination thereof, wherein the data satisfies an on-route distance criterion and a downstream link count criterion;
determine, via the at least one processor, a plurality of downstream links associated with the LRS based on processing of the data associated with at least one of the LRS and the map-matched link;
select, via the at least one processor, a candidate downstream link from the plurality of downstream links based upon a determination that a heading difference between the LRS and the candidate downstream link is less than a threshold heading value; and
update the one or more attributes of the LRS in the map database, based on the candidate downstream link,
wherein to update the one or more attributes of the LRS in the map database, the at least one processor is further configured to assign the LRS to the candidate downstream link, wherein a map-matched location of the LRS is a link start location of the candidate downstream link.

2. The system of claim 1, wherein the at least one processor is further configured to generate a notification in a user interface of a user device based on the updated one or more attributes of the LRS.

3. The system of claim 1, wherein the downstream link count criterion includes a condition that the map-matched link associated with the LRS has at least two connected downstream links in immediate downstream of the map-matched link.

4. The system of claim 1, wherein the on-route distance criterion comprises a condition that an on-route distance between the map-matched location of the LRS and a link end location of the map-matched link associated with the LRS is less than a threshold distance, and wherein the link end location is based on a first heading of the LRS and a driving direction of the map-matched link.

5. The system of claim 1, wherein the data comprises a link ID of the map-matched link associated with the LRS, a map-matched location of the LRS, a first heading of the map-matched link associated with the LRS, or a combination thereof.

6. The system of claim 5, wherein to determine the plurality of downstream links associated with the LRS, the at least one processor is further configured to:
search in downstream of the LRS based on the link ID of the map-matched link,
wherein the plurality of downstream links have a common start node.

7. The system of claim 5, wherein to select the candidate downstream link from the plurality of downstream links, the at least one processor is further configured to:
obtain a second heading of each of the plurality of downstream links based on link data of each of the plurality of downstream links;
determine the heading difference between the LRS and each of the plurality of downstream links, based on the first heading of the map-matched link associated with the LRS and the second heading of each of the plurality of downstream links; and select the candidate downstream link from the plurality of downstream links.

8. The system of claim 5, wherein the one or more attributes of the LRS comprise the link ID of the map-matched link associated with the LRS and the map-matched location of the LRS.

9. A method for updating one or more attributes of a learned road sign (LRS), comprising:
receiving, via one or more sensors from road sign observations, data associated with the LRS, a map-matched link associated with the LRS from a map database, or a combination thereof, wherein the data satisfies an on-route distance criterion and a downstream link count criterion;
determining, via one or more processors, a plurality of downstream links associated with the LRS based on processing of the data associated with at least one of the LRS and the map-matched link;
selecting, via the one or more processors, a candidate downstream link from the plurality of downstream links based upon a determination that a heading difference between the LRS and the candidate downstream link is less than a threshold heading value; and
updating the one or more attributes of the LRS in the map database, based on the candidate downstream link,
wherein to update the one or more attributes of the LRS in the map database, the at least one processor is further configured to assign the LRS to the candidate downstream link, wherein a map-matched location of the LRS is a link start location of the candidate downstream link.

10. The method of claim 9, wherein the method further comprising generating a notification in a user interface of a user device based on the updated one or more attributes of the LRS.

11. The method of claim 9, wherein the downstream link count criterion includes a condition that the map-matched link associated with the LRS has at least two connected downstream links in immediate downstream of the map-matched link.

12. The method of claim 9, wherein the on-route distance criterion comprises a condition that an on-route distance between the map-matched location of the LRS and a link end location of the map-matched link associated with the LRS is less than a threshold distance.

13. The method of claim 12, wherein the link end location is based on a first heading of the LRS and a driving direction of the map-matched link.

14. The method of claim 9, wherein the data comprises a link ID of the map-matched link associated with the LRS, a map-matched location of the LRS a first heading of the map-matched link associated with the LRS, or a combination thereof.

15. The method of claim 14, wherein the determining the plurality of the downstream links associated with the LRS further comprises:
searching in downstream of the LRS based on the link ID of the map-matched link,
wherein the plurality of the downstream links have a common start node.

16. The method of claim 14, wherein the selecting of the candidate downstream link from the plurality of downstream links further comprises:
obtaining a second heading of each of the plurality of downstream links based on link data of each of the plurality of downstream links;
determining the heading difference between the LRS and each of the plurality of downstream links, based on the first heading of the map-matched link associated with the LRS and the second heading of each of the plurality of downstream links; and
selecting the candidate downstream link from the plurality of downstream links.

17. The method of claim 14, wherein the one or more attributes of the LRS comprise the link ID of the map-matched link associated with the LRS and the map-matched location of the LRS.

18. A computer program product comprising at least one non-transitory computer-readable storage medium having stored thereon computer-executable program code instructions which when executed by a computer, cause the computer to carry out operations for updating one or more attributes of a learned road sign (LRS), the operations comprising:
receiving, via one or more sensors from road sign observations, data associated with the LRS, a map-matched link associated with the LRS from a map database, or a combination thereof, wherein the data satisfies an on-route distance criterion and a downstream link count criterion;
determining, via one or more processors, a plurality of downstream links associated with the LRS based on processing of the data associated with at least one of the LRS and the map-matched link;
selecting, via the one or more processors, a candidate downstream link from the plurality of downstream links based upon a determination that a heading difference between the LRS and the candidate downstream link is less than a threshold heading value; and
updating the one or more attributes of the LRS in the map database, based on the candidate downstream link,
wherein to update the one or more attributes of the LRS in the map database, the at least one processor is further configured to assign the LRS to the candidate downstream link, wherein a map-matched location of the LRS is a link start location of the candidate downstream link.

19. The computer program product of claim 18, wherein to select the candidate downstream link from the plurality of downstream links, the operations further comprising:
obtaining a second heading of each of the plurality of downstream links based on link data of each of the plurality of downstream links;
determining the heading difference between the LRS and each of the plurality of downstream links, based on a first heading of the map-matched link associated with the LRS and the second heading of each of the plurality of downstream links; and
selecting the candidate downstream link from the plurality of downstream links.

* * * * *